United States Patent [19]

Inomata et al.

[11] Patent Number: 4,573,550

[45] Date of Patent: Mar. 4, 1986

[54] EXHAUST PIPE APPARATUS FOR VEHICLE

[75] Inventors: Fumio Inomata, Saitama; Kazuharu Wakusaka, Tokyo, both of Japan

[73] Assignee: Honda Giken Kogyo Kabushiki Kaisha, Tokyo, Japan

[21] Appl. No.: 698,636

[22] Filed: Feb. 6, 1985

[30] Foreign Application Priority Data

Feb. 8, 1984 [JP] Japan ............................ 59-16543[U]

[51] Int. Cl.[4] ............................................ B60K 13/04

[52] U.S. Cl. .................................. 180/296; 180/215; 180/309

[58] Field of Search ............... 180/215, 217, 219, 225, 180/7.4, 89.2, 296, 309; 280/782; 440/89; 114/270; 60/324

[56] References Cited

U.S. PATENT DOCUMENTS 2,395,909 3/1946 Scaife ................................ 180/89.2

3,524,316 8/1978 McKee ................................ 60/303

4,484,651 11/1984 Hattori et al. ...................... 180/225

*Primary Examiner*—David M. Mitchell

*Assistant Examiner*—Richard M. Camby

*Attorney, Agent, or Firm*—Lyon & Lyon

[57] ABSTRACT

An exhaust pipe apparatus for a vehicle in which an exhaust pipe for an engine is disposed below an occupant's seat. The apparatus includes an auxiliary exhaust pipe having a bent portion which is bent at a substantially right angle with respect to the axis of the exhaust pipe. The auxiliary exhaust pipe is water-tightly connected to the rear end portion of the exhaust pipe in such a manner that the auxiliary exhaust pipe is pivotable between a reclining position where it is reclined below the seat and an erect position where it is erected above the seat. This arrangement makes it possible to effectively prevent water from entering the exhaust pipe when the vehicle is running through a ford, for example, by pivoting the auxiliary exhaust pipe, which is normally placed at a relatively low position, to the erect position and retaining the auxiliary exhaust pipe in this position.

3 Claims, 3 Drawing Figures

EXHAUST PIPE APPARATUS FOR VEHICLE

BACKGROUND OF THE INVENTION

The present invention relates to an exhaust pipe apparatus for a vehicle, such as a buggy car or the like which runs not only on an ordinary road but also through a ford like a swamp, a marsh, a lake, a river and so forth. More specifically, the invention pertains to an exhaust pipe apparatus for a vehicle of the type described above in which an exhaust pipe for an engine is disposed below an occupant's seat.

A buggy car is generally arranged such that its engine exhaust pipe is installed at a higher position than that in an ordinary vehicle in order to prevent water from entering the exhaust pipe when the buggy car is running through a ford. It is, however, not possible to unlimitedly increase the height of the installation position of the exhaust pipe owing to its positional relation to the occupant's seat.

SUMMARY OF THE INVENTION

Accordingly, it is a primary object of the present invention to provide an exhaust pipe apparatus for a vehicle, such as a buggy car, which is capable of well preventing water from entering the engine exhaust pipe when the vehicle is running through a ford without the need to dispose the exhaust pipe at a particularly high position and therefore makes it possible to greatly increase the maximum depth of water at which the vehicle is capable of running.

To this end, according to the present invention, there is provided an exhaust pipe apparatus for a vehicle in which an exhaust pipe for an engine is disposed below an occupant's seat, comprising an auxiliary exhaust pipe having a bent portion which is bent at a substantially right angle with respect to an axis of the exhaust pipe, the auxiliary exhaust pipe being water-tightly connected to the rear end portion of the exhaust pipe in such a manner that the auxiliary exhaust pipe is pivotable between a reclining position where it is reclined below the occupant's seat and an erect position where it is erected above the seat.

By virtue of the above-described arrangement, the following various advantages are obtained. When the vehicle is to run through a ford, the auxiliary exhaust pipe is pivoted to its erect position to hold its upper end projecting above the surface of the water, whereby it is possible to prevent water from entering the exhaust pipe. Thus, it is possible to greatly increase the maximum depth of water at which the vehicle is capable of running without the need to dispose the exhaust pipe at a particularly high position. In addition, by normally placing the auxiliary exhaust pipe in its reclining position, it is possible to prevent the auxiliary exhaust pipe from interfering with any external object and it is, consequently, possible for the vehicle to run on a land and to be housed in a garage without hindrance.

Further, if a remote controller is attached to the auxiliary exhaust pipe to enable a driver to effect operations for erecting and reclining the auxiliary exhaust pipe while occupying a driving position in which he is seated on the seat of the vehicle, then it becomes possible to change over the position of the auxiliary exhaust pipe extremely easily and quickly in accordance with the change in the running condition of the vehicle at the time when it shifts from the ford running to the land running and vice versa. Thus, it is possible for the driver to enjoy further comfortable running of the vehicle.

The above and other objects, features and advantages of the present invention will become clear from the following detailed description of a preferred embodiment thereof, taken in conjunction with the accompanying drawings.

DESCRIPTION OF THE PREFERRED EMBODIMENT

The present invention will be described hereinunder through one embodiment in which the invention is applied to a buggy car.

Figure 1:
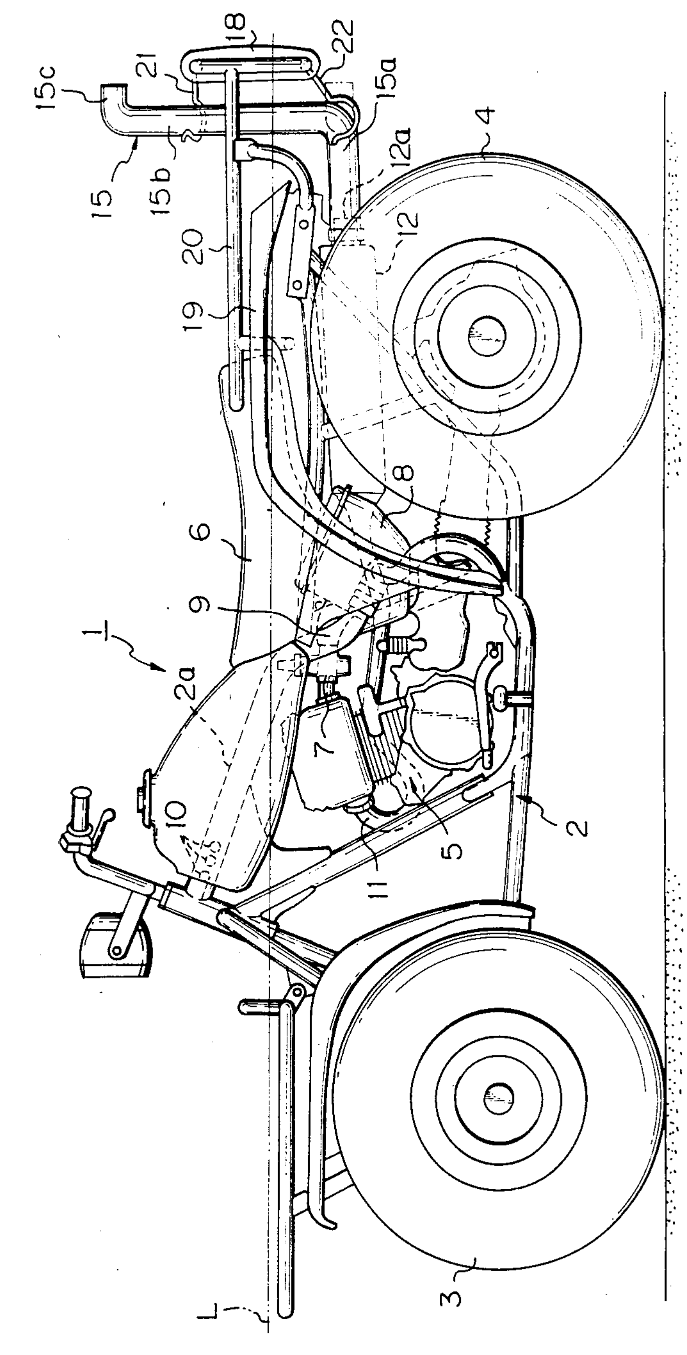
FIG. 1 is a side elevational view of a buggy car to which one embodiment of an exhaust pipe apparatus according to the present invention is applied.

Referring first to FIG. 1, a buggy car 1 includes a body frame 2 having front wheels 3 and rear wheels 4 respectively disposed at its front and rear parts in pairs. An engine 5 for driving the rear wheels 4 is mounted on the body frame 2 at a position intermediate between the front and rear wheels 3, 4. Further, an occupant's seat 6 is attached to the body frame 2 above the engine 5 and the rear wheels 4.

An air inlet pipe 9 is connected at one end thereof to the inlet of an air cleaner 8 of a carburetor 7 which is mounted on the rear side of the engine 5. The other end of the air inlet pipe 9 communicates with the inside of a main pipe **2*a* constituting the upper part of the body frame 2. A plurality of air inlets 10 are formed in the uppermost portion of the main pipe 2*a*. Thus, the air inlets 10 of the intake system for the engine 5** are provided at a relatively high position of the vehicle, whereby water is prevented from entering the intake system when the vehicle is running through a ford.

An exhaust pipe 11 which is connected to the front side of the engine 5 is arranged so as to extend sideward of the engine 5 and below the seat 6. The downstream portion of the exhaust pipe 11 is constituted by a muffler 12.

Figure 2:
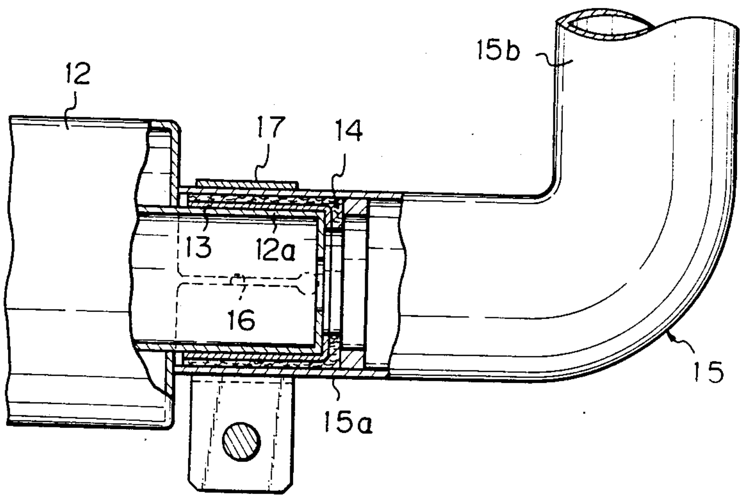
FIG. 2 is an enlarged vertically-sectioned side elevational view of an essential part of the buggy car shown in FIG. 1.
Figure 3:
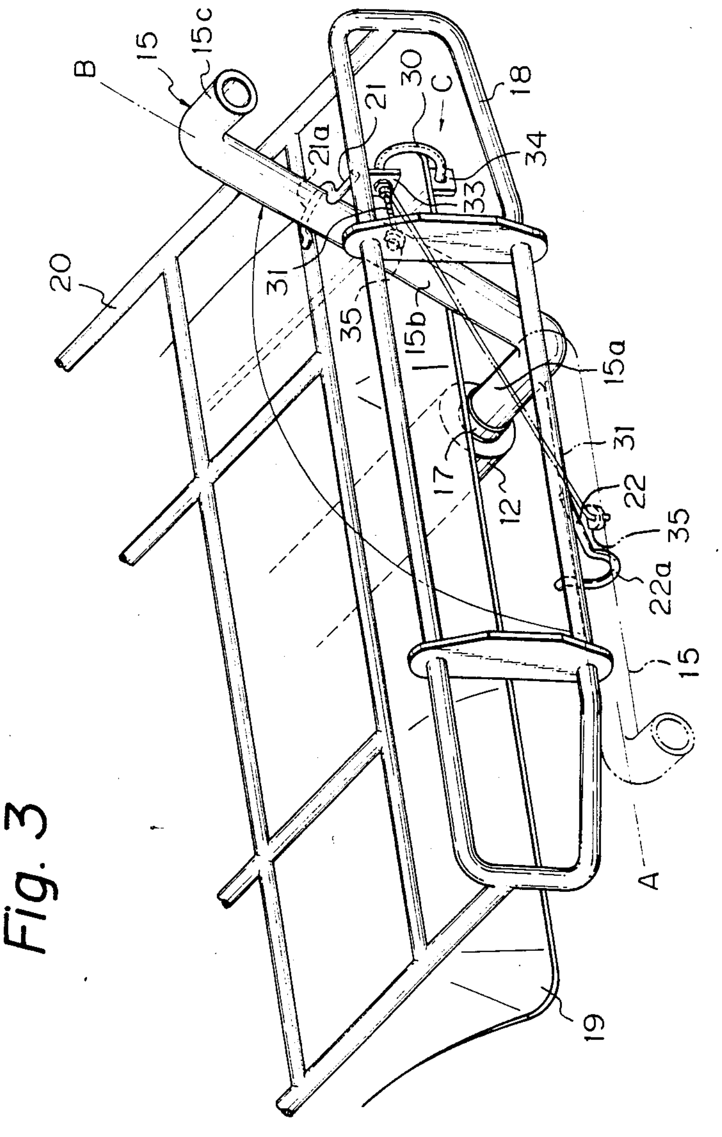
FIG. 3 is a perspective view of an essential part of the car shown in FIG. 1.

Referring next to FIGS. 2 and 3, an auxiliary exhaust pipe 15 is pivotably and water-tightly connected to the outer periphery of a tail pipe **12*a* of the muffler 12 through a bushing 13 of a copper plate and a gasket 14 interposed therebetween. The auxiliary exhaust pipe 15 has a joint portion 15*a* provided with one or a plurality of slits 16 which are adapted for providing elasticity required to tightly grip the gasket 14. Further, if necessary, a tightening band 17 is provided on the outer periphery of the joint portion 15*a*. Thus, the auxiliary exhaust pipe 15 is pivotably and water-tightly connected to the tail pipe 12*a***.

The auxiliary exhaust pipe 15 consists of: the joint portion **15*a* connected to the tail pipe 12*a*; a bent portion 15*b* which is elongated from the joint portion 15*a* while bending at a substantially right angle with respect to the axis of the exhaust pipe 11; and an exhaust port portion 15*c* which rearwardly extends from the bent portion 15*b* at a substantially right angle with respect to the axis of the bent portion 15*b*. Thus, the auxiliary exhaust pipe 15** has a Z-shape as a whole.

A rear bumper 18 is disposed rearwardly of the auxiliary exhaust pipe 15. The rear bumper 18 is connected to the rear end of a carrier 20 which is connected to the body frame 2 together with a rear fender 19.

The auxiliary exhaust pipe 15 is arranged such that it is pivotable between a reclining position A where it is reclined below the rear bumper 18 and an erect position B where it is erected above the rear bumper 18. When the auxiliary exhaust pipe 15 is in the erect position B, its upper end, that is, the exhaust port portion 15*c* is located at a position which is equal in height to or higher than the position of the air inlets 10.

In order to retain the auxiliary exhaust pipe 15 in the positions A, B, respectively, a pair of upper and lower stays 21, 22 are secured to the rear bumper 18. The stays 21, 22 are formed of a resilient steel plate or synthetic resin and have at their respective distal ends Ω-shaped clamping portions 21*a*, 22*a* which are capable of resiliently clamping the bent portion 15*b* of the auxiliary exhaust pipe 15.

As shown in FIG. 3, in the vicinity of the rear bumper 18 is provided a portion of a remote controller C for remotely erecting and reclining the auxiliary exhaust pipe 15. The remote controller C includes a wire 31 and a wire guide tube 30. The wire 31 extends from an operating part (not shown) installed on a part of the vehicle in the vicinity of the driver being seated on the seat 6 and has its distal end connected to a longitudinally intermediate region of the bent portion 15*b* of the auxiliary exhaust pipe 15. The wire guide tube 30 guides the wire 31 along its operating path defined by the tube 30. The remote controller C is arranged such that it is possible for the driver to pivot the auxiliary exhaust pipe 15, which is normally reclined in the reclining position A due to a biasing force of a spring (not shown), to the erect position B by actuating the operating portion of the controller C in such a manner to pull the wire 31.

It is to be noted that downwardly projecting holders 33, 34 are respectively provided on the proximal end of the clamping portion 21*a* and the rear fender 19. The holders 33, 34 retain the tube 30 which is received in respective bores in the holders 33, 34. The distal end of the wire 31 projecting from the distal end of the tube 30 is retained by a bracket 35 provided on the bent portion 15*b* of the auxiliary exhaust pipe 15.

It is to be noted also that the reference symbol L in FIG. 1 represents the surface of the water in a ford.

The following is a description of the operation of the above-described embodiment. When the buggy car 1 is to run through a ford of a lake, a river and so forth, the operating portion (not shown) of the remote controller C is actuated such that the auxiliary exhaust pipe 15 is pivoted to the erect position B as shown by the solid line in FIG. 3 and is engaged with the clamping portion 21*a* of the upper stay 21. By so doing, when the vehicle is running through the ford, even if the engine 5 and the exhaust pipe 15 go down below the water surface L, water does not enter the intake and exhaust systems as long as the air inlets 10 and the exhaust port portion 15*c* of the auxiliary exhaust pipe 15 are above the water surface L. Thus, the vehicle is capable of running through the ford.

When the buggy car 1 is to run on the land or to be housed in a garage, the remote controller C is actuated such that the auxiliary exhaust pipe 15 is pivoted to the reclining position A in the manner shown by the chain line in FIG. 3 by means of the biasing force of the spring (not shown) and is engaged with the lower stay 22. By so doing, it is possible to prevent the auxiliary exhaust pipe 15 from interfering with any external object.

Although the auxiliary exhaust pipe 15 is erected and reclined by means of the remote controller C in the illustrated embodiment, the auxiliary exhaust pipe 15 may be directly erected and reclined by hand. Further, it is a matter of course that, in place of the wire 31 employed in the above-described embodiment, another means, for example, a link mechanism may be employed to erect and recline the auxiliary exhaust pipe 15.

What is claimed is:

1. An exhaust pipe apparatus for a vehicle in which an exhaust pipe for an engine is disposed below an occupant's seat, comprising:

an auxiliary exhaust pipe having a bent portion which is bent at a substantially right angle with respect to an axis of said exhaust pipe, said auxiliary exhaust pipe being water-tightly connected to a rear end portion of said exhaust pipe in such a manner that said auxiliary exhaust pipe is pivotable between a reclining position where the pipe is reclined below said seat and an erect position where the pipe is erected above said seat.

2. An exhaust pipe apparatus for a vehicle according to claim 1, further comprising a remote controller for remotely reclining and erecting said auxiliary exhaust pipe.

3. An exhaust pipe apparatus for a vehicle according to claim 1, wherein said engine has an intake system with air inlets, said auxiliary exhaust pipe having an exhaust port portion, said exhaust port portion taking a position not lower than said air inlets when the auxiliary exhaust pipe is at said erect position.

* * * * *